J. CLARK.
CLAMPING RING FOR PIPE COUPLINGS.
APPLICATION FILED DEC. 21, 1910.
999,548.
Patented Aug. 1, 1911.
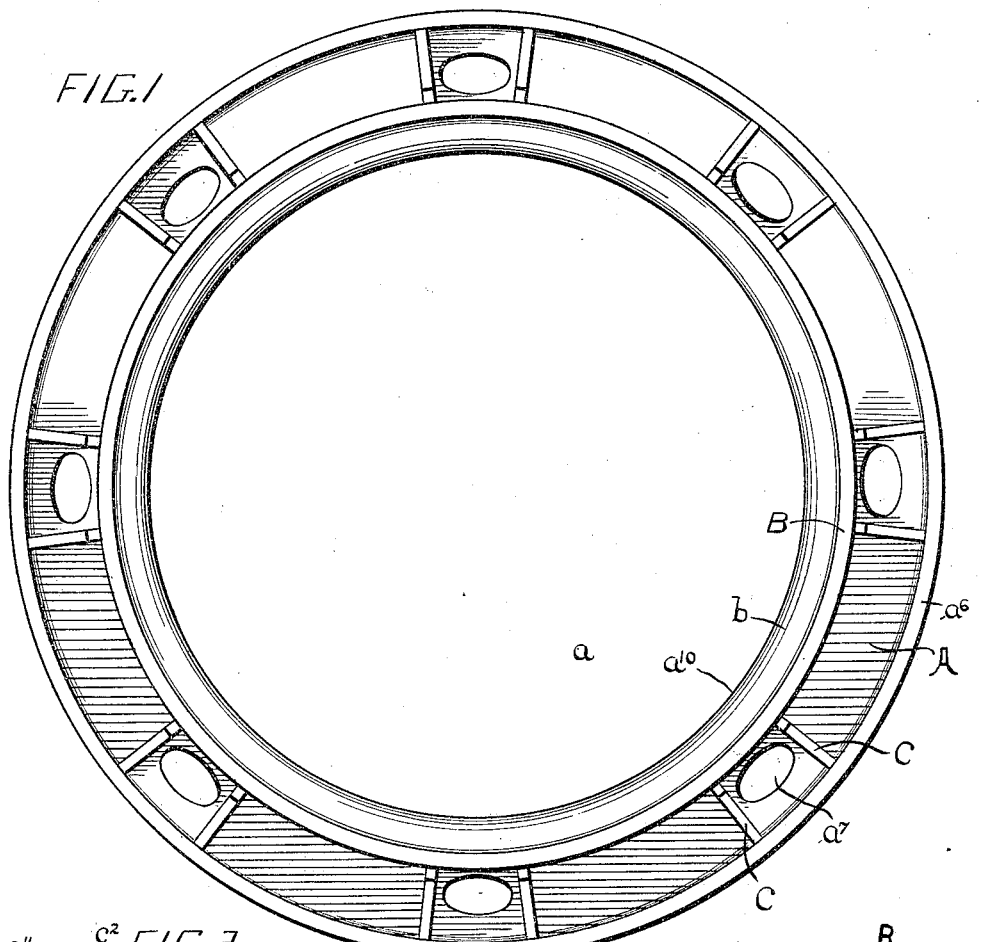
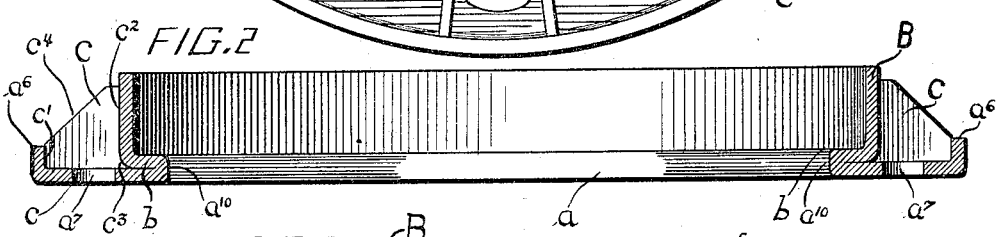
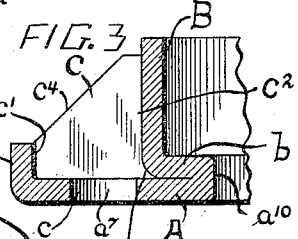
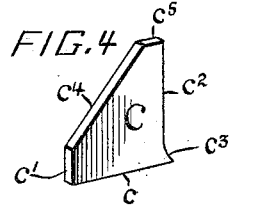
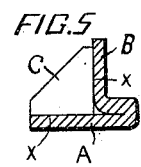
WITNESSES:
BY James Clark
INVENTOR
Attorneys

UNITED STATES PATENT OFFICE.

JAMES CLARK, OF BRADFORD, PENNSYLVANIA, ASSIGNOR TO S. R. DRESSER MANUFACTURING COMPANY, OF BRADFORD, PENNSYLVANIA, A CORPORATION OF PENNSYLVANIA.

CLAMPING-RING FOR PIPE-COUPLINGS.

999,548.

Specification of Letters Patent.   Patented Aug. 1, 1911.

Application filed December 21, 1910. Serial No. 598,624.

*To all whom it may concern:*

Be it known that I, JAMES CLARK, a citizen of the United States, residing at Bradford, in the county of McKean and State of Pennsylvania, have invented certain new and useful Improvements in Clamping-Rings for Pipe-Couplings; and I do hereby declare the following to be a full, clear, and exact description of the invention, such as will enable others skilled in the art to which it appertains to make and use the same.

My invention consists in the novel features hereinafter described reference being had to the accompanying drawings which show an embodiment of the invention which I have selected for purposes of illustration and said invention is fully disclosed in the following description and claims.

The object of my invention is to provide a clamping ring for pipe couplings formed of wrought metal (and preferably of sheet metal) such as wrought iron or steel, which can be cheaply made and which will possess great strength and at the same time which may be made of comparatively light or thin material.

Referring to the drawing which shows one embodiment selected by me for the purpose of illustrating my invention, Figure 1 represents a plan view of the completed ring. Fig. 2 represents a sectional view of the same. Fig. 3 is an enlarged sectional view of a portion of the ring. Fig. 4 is a detail view of one of the braces. Fig. 5 is a detail sectional view of a slight modification.

The body of the ring is preferably formed of sheet metal, as wrought iron or steel and is made from a flat annular blank by pressing by means of suitable dies or otherwise, to give it the desired shape. The body of the ring comprises an annular plate member A having a central pipe aperture $a$, and an up-turned annular reinforcing flange $a^6$, and a flange member B having an annular wall of greater diameter than the pipe aperture, and an inwardly extending annular portion $b$, at the end adjacent to the plate member which is united with the plate member at the pipe aperture, the plate member and flange member being integral. The inner face $a^{10}$ of the pipe aperture is straight and substantially parallel with the axis of the ring, and the space within the flange member adjacent to the pipe forms a recess to receive a packing ring when the clamping ring is used in a pipe coupling, as will be readily understood by those skilled in the art. The plate member is provided with a plurality of apertures $a^7$ of unequal diameters and preferably of substantially oval form for the reception of the clamping bolts of the coupling. In order to further reinforce the ring structure I provide a plurality of braces C which in this instance are stamped, cut or otherwise prepared, preferably from sheet metal of the same kind that the ring is made from, although this is not essential, and which are entirely separate from the other portions of the ring. In cutting the annular blanks from which the ring body is made from rectangular sheets of metal, it is obvious that there will result disks of the metal where the central aperture of the blanks are formed, and substantially triangular shaped corner pieces. The central disks may be utilized in making blanks for smaller sizes of rings, and the scrap portions may be advantageously utilized in making the braces C, thus minimizing the wastage in cutting up the sheet material.

The braces C are preferably provided with a straight bottom edge $c$ to engage the face of the plate member, a substantially perpendicular edge $c'$ to engage the exterior flange $a^6$ of the plate member, a longer edge $c^2$ substantially perpendicular to the edge $c$ for engaging the exterior face of the annular wall of the flange member, terminating adjacent to the edge $c$ in a curved or angular projection or toe $c^3$ and an inclined edge $c^4$ connecting the edge $c'$ with a short top edge $c^5$. The particular shape of the brace pieces between the upper end of edge $c'$ and the upper end of edge $c^2$ is not important but the form shown I have found economical and satisfactory. These braces are inserted in the portion of the ring between the flange member B and the exterior flange $a^6$ and are preferably arranged in pairs as shown on opposite sides of each bolt hole and are held in place by frictional contact, and by the engagement of the toe portion $c^3$ between the plate member A and the flange member B as shown.

In some cases I may dispense with the toe portion $c^3$ and make the edges $c^2$ of the wedges straight at their lower portions but I prefer to make them as shown. The wedges may be placed in position before the body of the ring is entirely formed, so that the parts of the ring body will be caused to grip the braces as they are pressed into final form, and hold them rigidly in position, or the braces may be driven laterally into place or sprung into place after the ring body is formed. In either case the engaged faces of the braces and the portions of the ring body are forced into such intimate contact that there is an interlocking of the particles of metal on said meeting faces, which faces are necessarily rather rough, and this engagement assists in holding the braces firmly in position.

The inwardly extending flange portion $b$ of the flange member B is preferably pressed into close engagement with the adjacent face of the plate member as shown, thereby reinforcing the ring where it surrounds the pipe aperture, and forms the packing recess.

The braces C may be held in position by brazing or welding or otherwise securing them to the plate member or the flange member or both, if desired, in which case the outer peripheral flange $a^6$ of the plate member may be dispensed with, but I prefer to form the plate member in any case with such peripheral flange.

In Fig. 5 I have illustrated a sectional view of a ring in which the braces are brazed along the lines of contact as indicated by $x$, $x$, and the outer flange $a^6$ of the plate member is omitted.

What I claim and desire to secure by Letters Patent is:—

1. A clamping ring for pipe couplings comprising a plate member provided with a central pipe aperture and bolt holes located at intervals around the same, a flange member having an annular flange of greater diameter than the pipe aperture and disposed substantially perpendicularly to and projecting from one face of the plate member, and braces of metal formed separately from the plate and flange members, and interposed between said members for reinforcing the same, said ring being provided with means for holding said separately formed braces rigidly in position.

2. A clamping ring for pipe couplings, comprising a plate member provided with an external peripheral reinforcing flange, a central pipe aperture and bolt holes located at intervals around the same, a flange member having an annular flange of greater diameter than the pipe aperture and disposed substantially perpendicularly to and projecting from one face of the plate member and radially disposed metal braces formed separately from the plate and flange members engaging the external peripheral flange of the plate member and the exterior face of the flange member, said braces being held in place by their engagement with said parts.

3. A clamping ring for pipe couplings comprising a plate member provided with a central pipe aperture, a peripheral reinforcing flange and a plurality of bolt holes, an integral flange member having an annular flange of greater diameter than the pipe aperture projecting from and substantially perpendicular to one face of the plate member, and braces formed separately from the plate and flange members, having portions to engage the exterior of the flange member, the adjacent face of the plate member and the inner face of the reinforcing flange and having each a projecting portion extending beneath a portion of the flange member, and between it and the plate member.

4. A clamping ring for pipe couplings formed of pressed wrought metal sheet and comprising a plate member having a central aperture, a peripheral reinforcing flange and a plurality of bolt holes, a flange member having an annular flange of greater diameter than the pipe aperture and an inwardly extending portion integral therewith and integral with the plate member and joining the plate member at the pipe aperture, and a plurality of metal braces, formed separately from the plate and flange members, arranged in pairs on opposite sides of the bolt holes and disposed radially with respect to the said members, said braces having a face engaging the plate member, and substantially perpendicular faces engaging the exterior of the flange member and the inner face of the reinforcing flange, and having a curved projecting toe extending inwardly between portions of the flange and plate members, beyond the plane of the exterior face of the flange member.

In testimony whereof I affix my signature, in the presence of two witnesses.

JAMES CLARK.

Witnesses:
H. M. WICK,
M. CLARK.